United States Patent [19]

Garrett

[11] Patent Number: 4,995,927

[45] Date of Patent: Feb. 26, 1991

[54] PROCESS FOR AND PRODUCT RELATED TO FABRICATING LINKED DUPLEX FILM WITH TRAPPED PRINTING

[76] Inventor: Arthur D. Garrett, 7136 N. Chimney Rock Pl., Tucson, Ariz. 85718

[21] Appl. No.: 171,854

[22] Filed: Mar. 22, 1988

[51] Int. Cl.[5] ............................................. B32B 31/00

[52] U.S. Cl. .................................... 156/152; 101/483; 156/191; 156/192; 156/277; 156/306.3; 204/165; 242/7.02; 242/55; 427/177; 428/906

[58] Field of Search ................ 493/187; 156/152, 192, 156/191, 277, 306.3, 184; 428/906; 101/426, 483; 427/177; 242/7.02, 55

[56] References Cited

U.S. PATENT DOCUMENTS

| | | | |
|---|---|---|---|
| 1,938,859 | 12/1933 | Potdevin . | |
| 2,679,968 | 6/1954 | Richter . | |
| 2,679,969 | 6/1954 | Richter . | |
| 2,935,418 | 5/1960 | Berthold et al. | 101/426 |
| 3,067,119 | 12/1962 | Ramaika | 204/165 |
| 3,308,722 | 3/1967 | Peterson . | |
| 3,462,329 | 8/1969 | Beyer | 156/277 |
| 3,607,519 | 9/1971 | Beyer . | |
| 3,784,434 | 1/1974 | Paisley et al. . | |
| 3,837,995 | 9/1974 | Floden . | |
| 3,869,329 | 3/1975 | Schweitzer, Jr. et al. . | |
| 3,901,755 | 8/1975 | Martin . | |
| 4,120,716 | 10/1978 | Bonet | 156/272.6 |
| 4,225,369 | 9/1980 | Felchlin . | |
| 4,564,452 | 1/1986 | Sharpe | 210/497.2 |
| 4,568,403 | 2/1986 | Egan . | |
| 4,605,454 | 8/1986 | Sayovitz et al. . | |

FOREIGN PATENT DOCUMENTS

| | | | |
|---|---|---|---|
| 1174398 | 12/1969 | United Kingdom | 156/277 |

*Primary Examiner*—John J. Gallagher

*Attorney, Agent, or Firm*—Merchant, Gould, Smith, Edell, Welter & Schmidt

[57] ABSTRACT

Disclosed are processes for fabricating linked duplex film with trapped printing, preferably without adhesives or adhesive inks. A preferred supply roll for use in this process is also disclosed, as are alternate preferred processes for fabricating the supply roll. The product roll which results from the preferred trapped printing process may be used on conventional equipment to fabricate bags or other packages in which no adhesive or adhesive inks are present between the linked layers of film.

66 Claims, 5 Drawing Sheets

FIG. 1
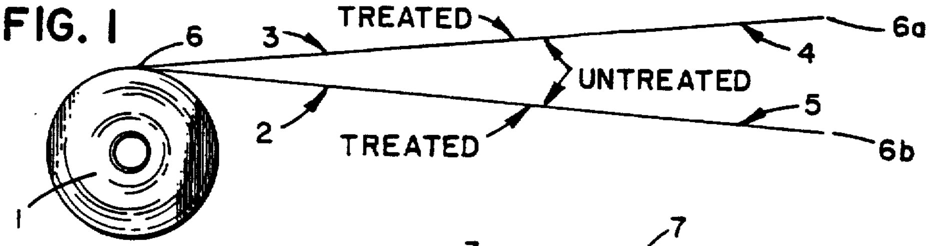
FIG. 2
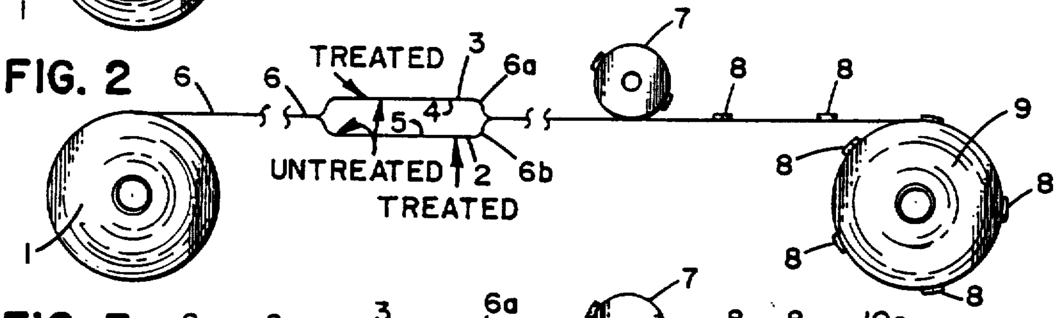
FIG. 3
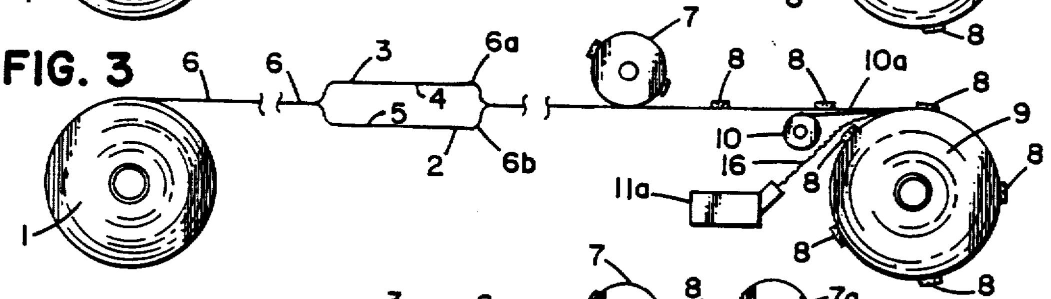
FIG. 3A
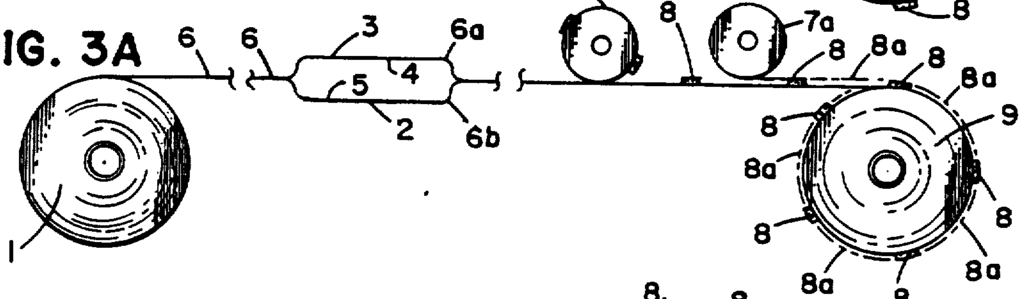
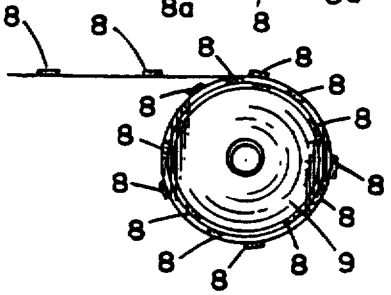
FIG. 4
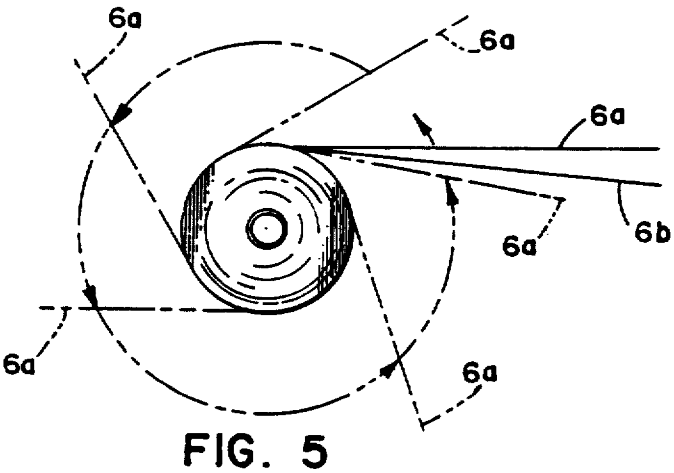
FIG. 5

FIG. 6
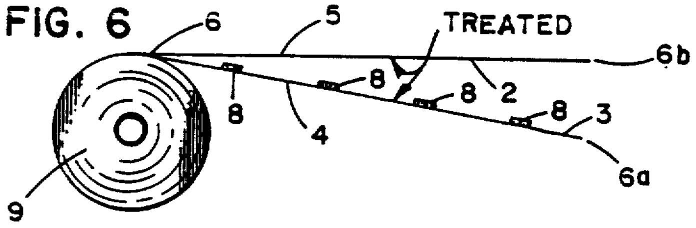
FIG. 7A
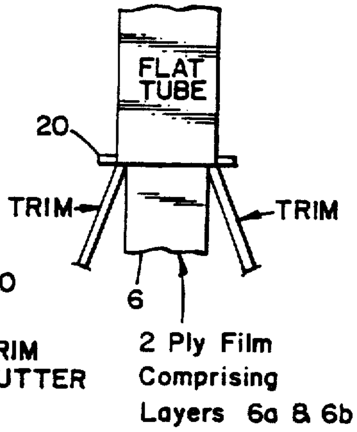
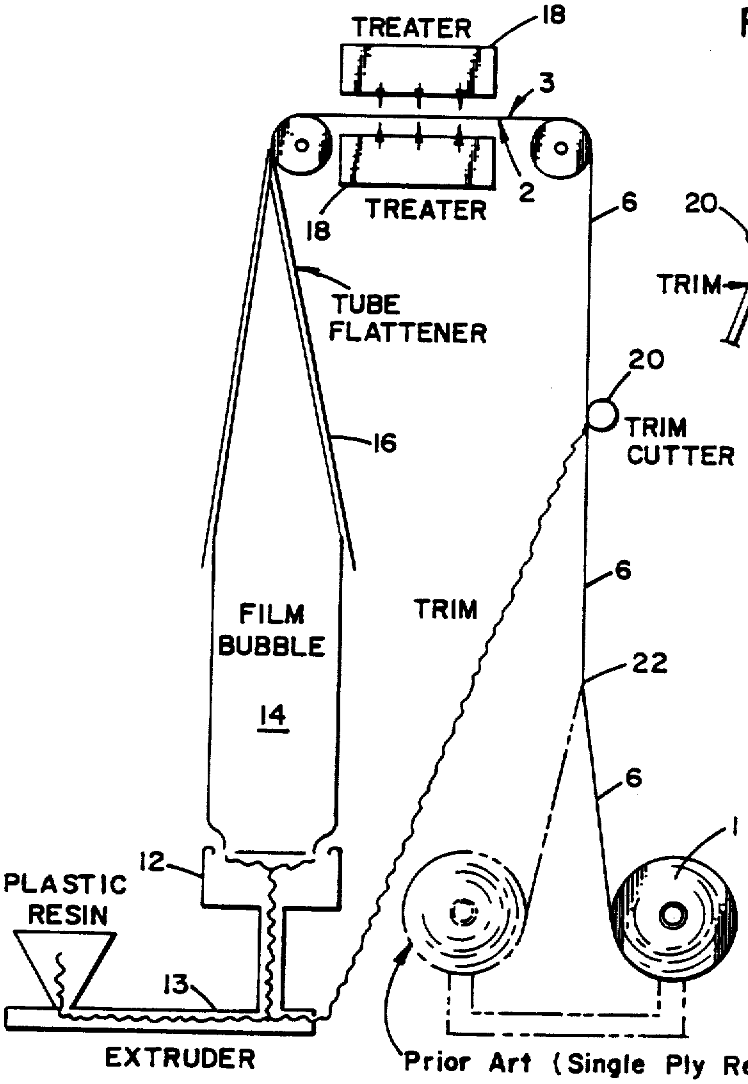
FIG. 7

FIG. 8
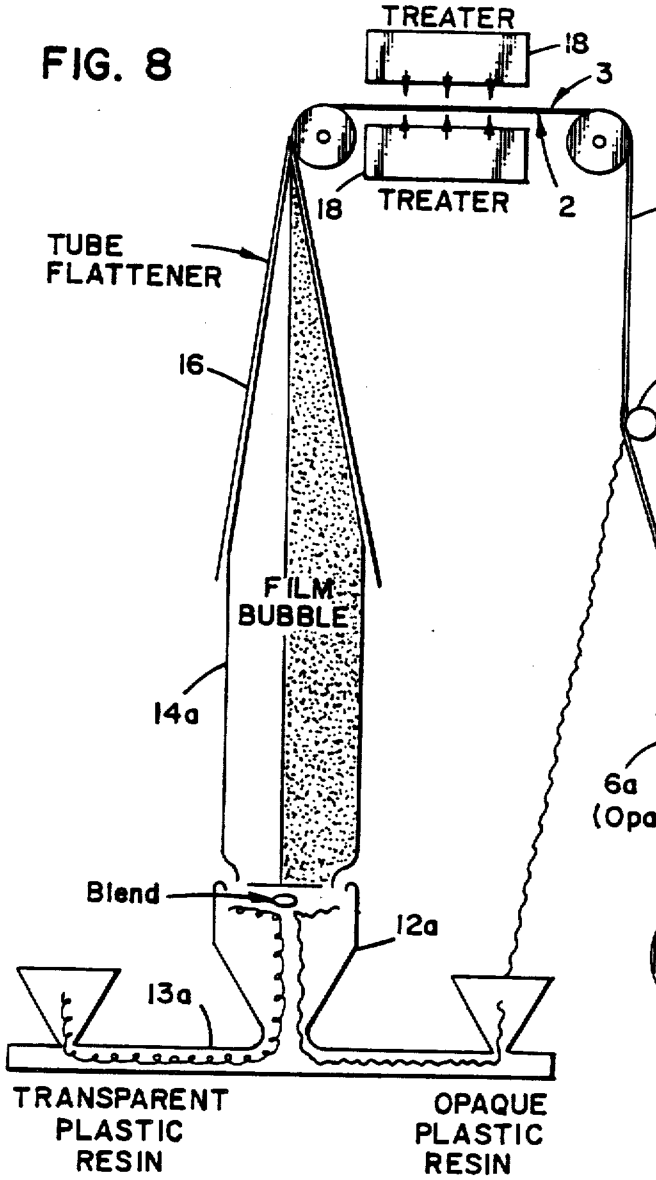
FIG. 8A
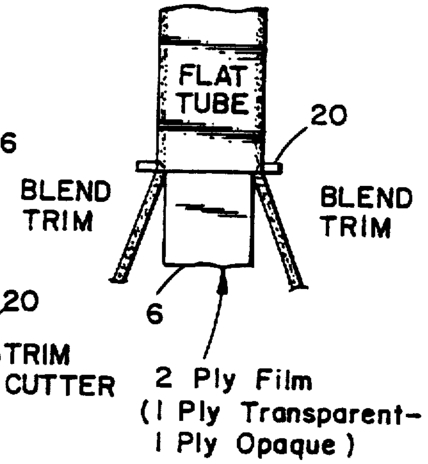
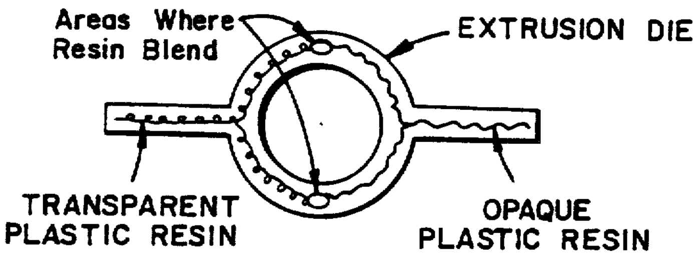
FIG. 8B

FIG. 12
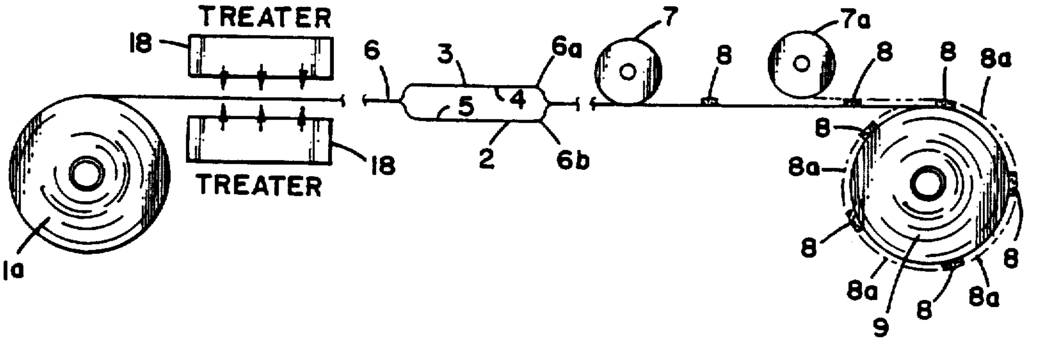
FIG. 13
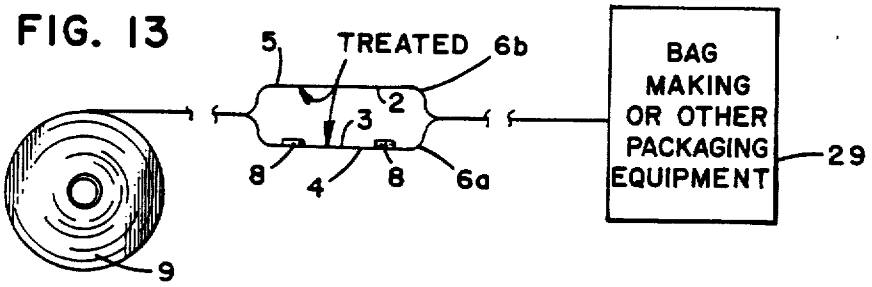
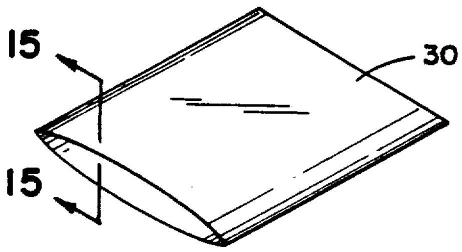
FIG. 14
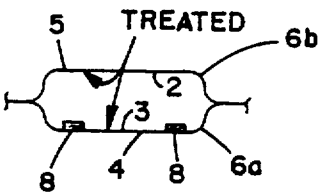
FIG. 15

PROCESS FOR AND PRODUCT RELATED TO FABRICATING LINKED DUPLEX FILM WITH TRAPPED PRINTING

BACKGROUND AND SUMMARY OF THE INVENTION

A plurality of embodiments are described in the present application. These embodiments relate to a new and useful improvement in the production of duplex films where trapped printing is desired or necessary. One of the present embodiments will sometimes be referred to in the present application as a supply roll embodiment; this embodiment relates to a supply roll of a two-ply or duplex film which is treated on both outside surfaces for printing or laminating and then wound onto a single supply roll. An additional embodiment described in the present application is sometimes referred to as a printing or trapped printing process; this embodiment comprises a process compatible with producing trapped printing on conventional, unmodified printing equipment without the necessity of adhesives or adhesive inks and is applicable to linking two polyethylene films without the use of adhesives or adhesive inks; it was previously thought impossible to successfully link one layer of polyethylene film to another layer of polyethylene film without the use of adhesives or adhesive inks.

The present invention is based on the discovery that two-ply film treated for printing or laminating on both outside surfaces could be produced on conventional film manufacturing equipment and then wound onto a single storage roll for successful later use. This discovery by itself was so contrary to conventional wisdom that the applicant had considerable difficulty in obtaining such material from film suppliers, who finally provided the material without warranting that it could usefully unwound from the storage roll.

The present printing invention is also based on the discovery that, when two-ply film is manufactured on conventional manufacturing equipment, is treated on both outside surfaces for printing or laminating, and is then wound on a single storage roll, an excellent surface attraction is created when the two treated surfaces are later brought together during an otherwise conventional printing and rewind process.

In carrying out the present supply roll invention, two-ply film that has been treated on both outside surfaces for printing or laminating is wound on a single supply roll. The present printing invention may then be carried out by unwinding the film from the single supply roll as a single two-ply sheet with its outside surfaces treated and by passing the two-ply sheet through a conventional printing process. Printing inks without adhesive properties are preferably used, although adhesive inks and adhesives may be employed if desired. Either a face or reverse image may be used. The film is then rewound, preferably with little or no cooling from conventional drying ovens, onto a single product roll. The outer most ply of the product roll is then preferably unwound for one turn and cut off so that the ends are even, and the product roll is unwound to make packaging or similar products with the ink trapped between the two treated surfaces, which are preferably in intimate face-to-face contact, although water or water vapor may also be introduced for an even greater linking of the surfaces, without adhesive or adhesives being required.

At this point in the preferred process, the two layers of film are linked to each other as a result of the attraction caused by the film treatment, by the heat from the press ovens, and possibly by the apparent discovery that the attraction achieved through the preferred printing process is increased by contact of surfaces that were manufactured at nearly the same time during the film manufacturing process; this latter explanation of the phenomenon by which the present printing invention works is not well understood by the applicant, and may not be correct, but it is postulated as one of the reasons for the success of the present printing process.

As previously indicated, an additional discovery related to the present printing invention is that, if water or water vapor is added to the duplex film layer after printing just prior to rewind, there is a greater attraction between the films.

The linked-duplex film fabricated through the present printing process is useful in the manufacture of premade bags for handfilling as well as with form-fill-seal equipment when using automatic filling equipment. If a film laminate is desired, the only additional requirement beyond that of the preferred process is the application of an adhesive or an adhesive ink during the film converting process. The remaining process is same as in the preferred process.

In U.S. Pat. Nos. 2,579,968 and 2,679,969; Richter describes the use of films that will facilitate a lamination process where the films being laminated have a natural affinity for one another and tend to cohere without adhesives. In U.S. Pat. No. 2,679,969 (see col. 3, lines 32–45), Richter states that a number of films and film combinations do not have the necessary inherent cohesive characteristics required to produce packages formed of laminates of such films and that polyethylene to polyethylene is a structure that falls within this category. However, contrary to this earlier teaching, the present invention enables fabrication of polyethylene to polyethylene linked duplex film structures without the use of adhesives or adhesive inks; further, such structures can now be produced on standard printing equipment without modification.

In U.S. Pat. Nos. 3,462,329 and 3,607,519, Beyer discloses trapped printing and lamination systems requiring two separate unwind or supply rolls. These patents disclose a film lamination using adhesive inks or overall adhesive coatings during the printing or laminating process.

In U.S. Pat. No. 3,462,329 at col. 1, lines 57–61, Beyer notes that, in the process of Richter, it was impossible to use polyethylene films due to the fact that the polyethylene is completely lacking in surface attraction. In col. 2 of this patent, after noting that his invention is compatible with polyethylene, Beyer discloses at lines 54–61 that his process produces a two-ply film laminate in which the films adhere to each other through the adhesive properties of the ink. Further, in col. 3, lines 63–67 of this patent, Beyer also recommends that, if the printing legend is small, an all-over lacquer or adhesive be added for sufficient adhesion.

As previously indicated, the processes disclosed in Beyer's patents require a printing press or other equipment having double unwind stands for separate supply rolls of film. Accordingly, the processes of Beyer cannot be used with conventional printing equipment or with conventional turret unwind stands used for continuous printing so that roll changes do not stop the printing process. When two separate rolls of film are used as in the Beyer processes, they will not normally have the same footage on both rolls, even if the film gauges are the same; this is because the process of film manufacture normally results in film gauge variations, and this in part results in film rolls having varying lengths of film rolled onto them. Accordingly, double roll processes cause more press shutdowns for roll changes due to variations in film footage on the separate rolls.

Further, the processes disclosed in Beyer's patents makes the use of thin films very difficult since for such films the unwind process of two separate supply rolls requires extra or very precise tension controls. For example, as will be recognized by those skilled in the art, use of polyethylene film with thicknesses under 0.001 inch is not presently a preferred manufacturing process where two separate supply rolls are used, due to the stretch and wrinkling that will occur before the two separate film layers come into contact. By way of contrast, the present printing invention can easily be run with two 0.0005 inch polyethylene films.

In U.S. Pat. No. 3,462,329 (see col. 4, lines 6-12), Beyer indicates that much thinner film laminates are possible with his process since the printing is carried out on two plies of film rather than on one thin ply. What Beyer fails to point out, however, is that his process requires that the film be unwound in single ply form, not just from one source but from two separate rolls, before the film is combined into a two-ply sheet for printing. Therefore, in order to control film stretch in very thin films during the Beyer process, there must be extra or unusually precise tension control devices for controlling the film stretch before the two single plies come together to form the two-ply film prior to printing.

In contrast to these prior art processes, the present trapped printing invention allows all conventional film printing presses, including those with conventional unwind stands, single or turret, to produce a two-ply film with locked-in printing. Accordingly, the present printing invention does not require modification of standard printing presses so that double unwind stands are available for creating a duplex or a laminated film. Further, the present printing process eliminates extra roll changes due to film variations, since both layers of film in the present printing process are already on a single unwind or supply roll.

As previously indicated, because film processed through the present printing invention is in the two-ply state from start to finish, the invention allows very thin films to be processed without extra tension controls applicable to systems in which individual thin films are combined after being wound off of separate rolls.

As also previously indicated, the present printing invention allows a linked duplex film to be processed without the use of adhesive inks or adhesives; significantly, this is true whether the size of the printed legend is large or small. This then eliminates the need for additional printing plates and for special inks and adhesives as used in the Beyer process and, accordingly, expense and toxic emissions are reduced.

The present printing process also permits the use of water or water vapor to create greater linking of the two plies, also without special inks or adhesives; this optional feature of the present printing invention is cost effective and does not create emission problems. (Although in U.S. Pat. No. 3,901,755 Martin discloses a method comprising water-induced bonding of films, the method disclosed requires a special chemical treatment of the films prior to the water application; no such special treatments are required if water or water vapor is used to augment the present printing invention.)

The present invention also makes it possible for standard bag-making equipment to make a duplex bag without special unwind equipment or special sealing equipment, since the two layers of the duplex film produced through the present printing process will remain linked together at the bag opening and during the bag-making process.

It is also possible with the preferred process to create a film which is more soft than films produced through conventional lamination processes; this is because there is less material between the layers and an absence of adhesives.

Although the present printing process is particularly applicable to converting and printing polyethylene film, the process is also applicable to polypropylene, coextrusion, or other films that can be plied during film processing.

Further, if the use of adhesive inks or adhesives is desired, the present printing process permits processing through use of adhesive inks or adhesives without any modification of conventional converting equipment; such laminates may be prepared on standard converting equipment by the simple addition of adhesive inks or adhesives within the otherwise identical process of the preferred printing invention. This gives film converters a great deal of versatility and allows many film converters to gain access to these production processes without a major investment in special equipment comprising double unwind stands or other equipment.

As will be further discussed below, the preferred process of the present printing invention uses a supply roll of two-ply film with both outside surfaces of the double ply treated in the conventional manner for printing. In addition, however, the present process may also be used with two-ply film with only one side treated for printing or adhesives, the treated surface being printed, the remainder of the process being as described below; although this latter process is possible, the linking of the duplex films without adhesives or adhesive inks through this approach is substantially inferior to the linking provided using the preferred printing process.

The processes of Richter are based on films having inherent cohesive characteristics. As previously indicated, Richter noted that polyethylene was one material which did not have such a characteristic. In contrast, Beyer's processes are based on the application of adhesive-type inks or adhesives to hold the two layers together. The present printing process eliminates the necessity for two-roll supply systems required of the Beyer processes, eliminates the necessity of adhesives and adhesive inks, and works well with all films capable of being plied, including polyethylene to polyethylene.

BRIEF DESCRIPTION OF THE DRAWINGS

FIG. 1 illustrates an unwind or supply roll of double-wound film prepared for use with the present printing invention.

FIGS. 2, 3, and 3A illustrate processes compatible with the present printing invention.

FIG. 4 illustrates a product roll fabricated with the present printing invention.

FIG. 5 is a schematic representation of one approach to correlating two films after printing to form trapped printing in accordance with the present printing invention.

FIG. 6 illustrates unwinding the product roll with the duplex film layers being schematically shown in proper orientation but separated for illustrative purposes.

FIGS. 7–9 illustrate alternate methods of preparing supply roll 1.

FIGS. 10–12 illustrate alternate processes compatible with the present printing invention.

FIG. 13 illustrates the manufacture of bags or other packages using a product roll fabricated with the present printing invention.

FIGS. 14 and 15 illustrate a bag or other package which has been manufactured using a product roll fabricated with the present printing invention.

DESCRIPTION OF THE PREFERRED EMBODIMENTS

Figure 9:
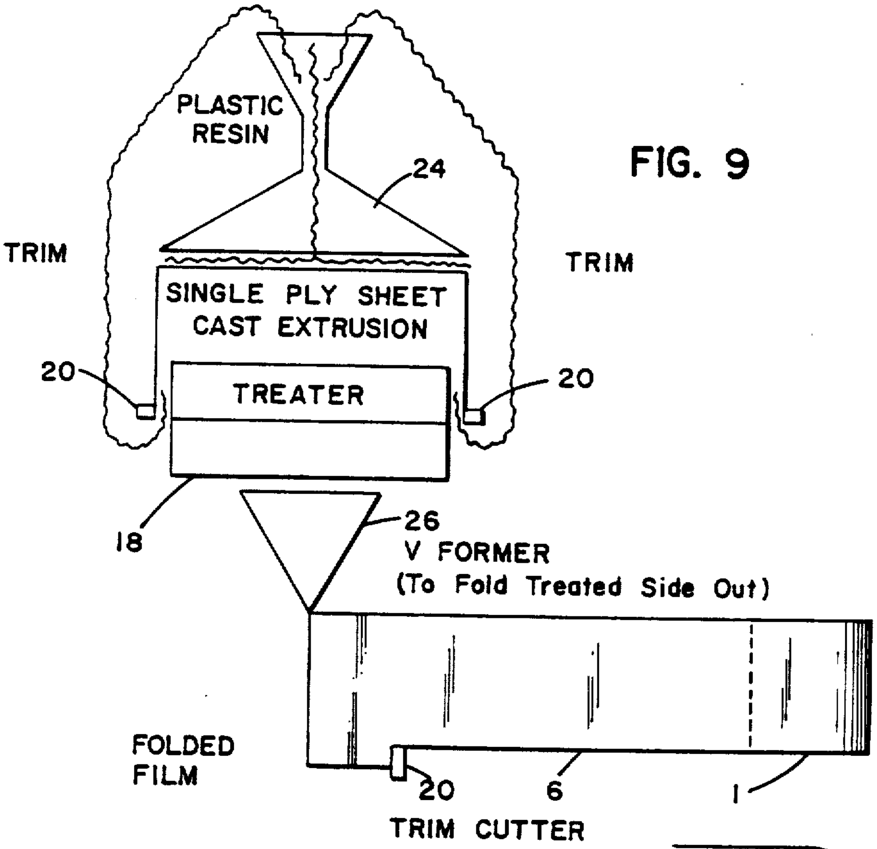

FIG. 1 shows a single unwind or supply roll 1 of two-ply film 6 comprising two separate sheets 6a and 6b with outside surfaces 2 and 3 treated for printing or laminating and with surfaces 4 and 5 untreated.

During normal prior art film production, film such as polyethylene may be produced by blowing polyethylene resin into a bubble, cooling and flattening the bubble, treating the outside surfaces of the flattened bubble so that the surfaces will readily accept printing or laminating adhesive, and trimming away the edges of the flattened bubble in order to create two separate sheets; in the prior art, these separate sheets are rolled unto two separate rolls. In contrast, in order to prepare unwind or supply roll 1 for use in conjunction with the present printing invention, the two sheets 6a and 6b with outside surfaces 2 and 3 treated for printing or laminating are simply rolled onto a single supply roll 1.

In an alternate conventional fabrication process commonly referred to as casting, film is conventionally manufactured as a single layer with one side treated for printing or laminating and then rolled unto a single roll after trimming. In contrast, a supply roll of two-ply film compatible with the present printing invention can also be created by folding film treated on one side prior to rewinding, with the untreated surfaces coming into contact inside the fold and with the treated outside surfaces of the duplex layer being wound on top one another as in supply roll 1.

In attempting to obtain unwind or supply roll 1 from film manufactures, the applicant was unable to find anyone with knowledge of two-ply film being manufactured with the outer surfaces treated as illustrated in FIG. 1. Contacts were made with Consolidated Thermo Plastics Company, 1701 First Avenue, P. O. Box 198, Chippewa Falls, Wis. 54729-0189; National Poly Products, Inc., 2111 Third Avenue, P. O. Box 180, Mankato, Minn. 56001; VisQueen Film Products, P. O. Box 2448, Richmond, Va. 23218; and Union Camp Corporation, 501 Williams Street, P. O. Box 608, Tomah, Wis. 54660. Union Camp finally agreed to provide test material only if the material was accepted whether or not it could be successfully unwound. Consolidated Thermo Plastics Company provided test material based on the same understanding and specifically stated that they knew of no prior requests for film to be supplied in the configuration shown in FIG. 1.

FIGS. 7 and 7A illustrate one preferred method of fabricating supply roll 1 illustrated in FIG. 1. FIG. 7 illustrates a film extrusion system using an extruder 11 which melts plastic resin and then extrudes the melted plastic from a die 12, which is typically circular. The plastic resin material is then pulled away from die 12 into a film bubble or tube 14 which is then cooled and flattened by a tube flattener 16. After bubble or tube 14 is flattened, the two outside layers 2 and 3 are then treated for printing or laminating by conventional treaters 18. A conventional film cutter 20 may then be used to trim the outside edges of the flattened tube in order to create a two-ply film 6 comprising layers 6a and 6b (see FIG. 7A, which schematically illustrates this trimming process); the trimmed material is then typically returned to extruder 11 in order to avoid unnecessary waste of material.

During normal prior art film manufacture, two-ply film 6 would be separated at a point 22, and each ply of film would be wound on separate rolls. In contrast, the present supply roll is formed by winding two-ply film 6 on single supply roll 1.

If in using supply roll 1 it would be desirable to have one of layers 6a or 6b opaque, it would be possible to print one of the layers a solid opaque color with an ink. Alternately, a process such as shown in FIGS. 8, 8A, and 8B may be employed in order to produce a two-ply film 6 in which one ply is transparent and one ply is opaque. In the process shown, two resin sources are used in an extrusion die 11a comprising two heating barrels, one containing transparent plastic resin, the other containing opaque plastic resin, the die being built so that one-half of its typically circular configuration is fed by each source of resin. The film fabrication process is then substantially similar as in FIG. 7 except that approximately one-half of film bubble 14a is opaque and approximately one-half is transparent. In the fabrication process, die 12a is oriented so that, when the tube is flattened by tube flattener 16, the transparent and opaque materials within film bubble 14a are substantially face-to-face and opposite one another. As with the process of FIG. 7, outside surfaces 2 and 3 are then treated for printing or laminating by conventional treaters 18, and the edges of the flattened tube are trimmed such as by using a conventional trimmer 20, which may be used to remove any blended material that has mixed from the two resin sources and which will create a two-ply film 6 having one ply transparent and the other ply opaque. The two-ply film 6 is then wound onto a single supply roll 1 for future use. Trim that is removed by cutter 20 is typically returned to the opaque side of the original extrusion process so that there will be no unnecessary waste of material.

A third process of fabricating supply roll 1 is illustrated in FIG. 9. In this process, conventional casting equipment 24 may be used to cast a single ply of cast extrusion film, typically from a straight die. The cast film is then typically treated on one side for printing or laminating by a conventional treater 18, the film typically also being trimmed for uniformity such as by trim cutters 20, with excess trim material being returned if desired to casting device 24. At this point in a typical prior art fabrication process, the treated trimmed film would be wound in a single ply onto a supply roll. In contrast, through the present process of forming supply roll 1, a "V" former 26 or other apparatus is used to fold the cast film with the treated side out, with the untreated side being folded inside the folded sheet. The folded sheet of film may then be trimmed along its folded edge in order to provide two layers, with two-ply film 6 then being wound onto a single supply roll 1.

In any of the processes used in forming supply roll 1, treatment for printing or laminating may be provided by conventional treaters 18 such as corona or flame treaters commonly used by those skilled in the art. There is no particular level of treatment known to be superior for use in connection with the present invention, and levels of 35 dynes have been found to produce satisfactory results, both with respect to the formation of supply roll 1 and with respect to unwinding supply roll 1 and using it successfully in the present trapped printing process.

Note that although the trimming processes discussed with respect to FIGS. 7-9 would typically be carried out prior to winding the film onto supply roll 1, the trimming operation could be delayed to occur during the present trapped printing process.

FIG. 2 illustrates a preferred process in accordance with the present printing invention in which a supply roll 1 is fed into a conventional printing press 7 which prints legends 8 on either of treated surfaces 2 or 3, any type of printing ink familiar to those skilled in the art being useful with this process. As previously indicated, special inks such as adhesive inks need not be used with the process illustrated in FIG. 2, although such special inks can be used if desired. The printed two-ply film is then wound onto a storage or product roll 9. FIG. 3 shows substantially the same process except that water 10*a* may be applied with a roller 10 or water vapor 11*a* may be applied with a vaporizer or similar device 11 just prior to rewind but after the film has left the drying oven.

The addition of water or water vapor as shown in FIG. 3 provides additional attraction between treated surfaces 2 and 3 when additional moisture in the film will not affect an end user's product. If the addition of water or water vapor is desired, use of a water vapor system 11 is generally an easier method of moisture application, since even a simple home vaporizer will serve as device 11 and is all that is necessary rather than a typically more complicated roller application, which normally requires significant press modification.

The process of FIG. 3A is similar to the process of FIG. 2 accept that, after a desired film legend 8 is applied, an adhesive 8*a* may be applied such as with a suitable roller 7*a*. In a typical application, coating 8*a* is applied to cover all but the outside edges of the film width, and the film is then rewound onto supply roll 9.

While the preferred printing process is carried out using a supply roll 1 having the outside surfaces of the two-ply layer treated for printing or lamination, a conventional two-ply roll of film without any surfaces treated for printing or lamination can also be used, the treatment for printing or lamination then being accomplished as part of the present trapped printing process just prior to the application of printed legends. A conventional two-ply roll of film with only one surface of the film having been treated prior to winding the film unto the supply roll may also be used; in such a case, the untreated outside surface can be treated for printing or laminating after unwind of the supply roll but prior to the remainder of the present trapped printing invention.

Figure 10:
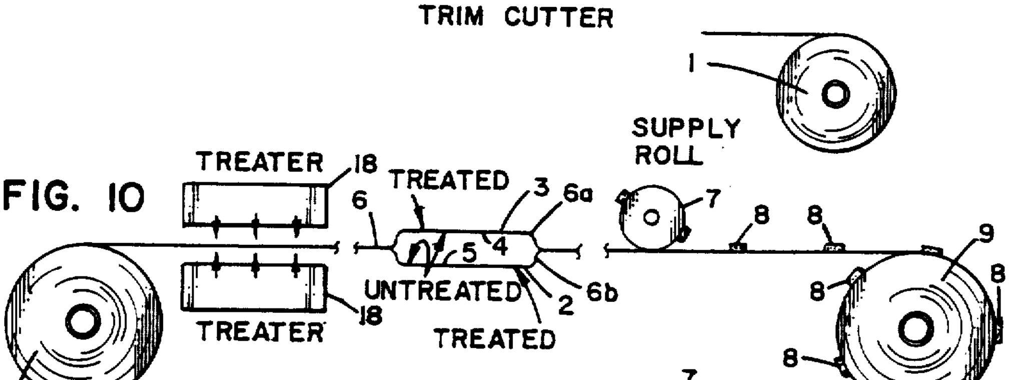
Figure 11:
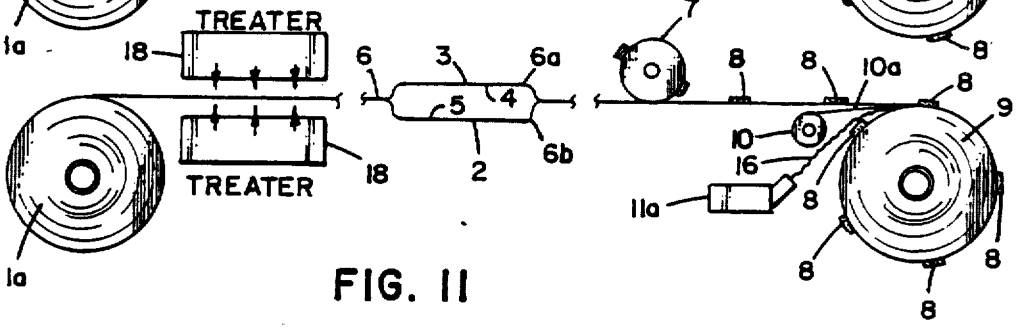

These alternate forms of the present trapped printing process are illustrated in FIGS. 10-12, which are the same as FIGS. 2, 3, and 3A except that supply roll 1*a* is shown instead of supply roll 1 and except that treaters 18 are shown in the system at a location following unwind of supply roll 1*a* and prior to printing of the film. As illustrated in FIGS. 10-12, one treater is located above the two-ply film being unwound, and the other treater 18 is located below the two-ply film.

As previously indicated, supply roll 1*a* differs from preferred supply roll 1 in that supply roll 1*a* has either both outside surfaces of the two-ply film in an untreated state when wound unto the roll or has only one outside surface treated. Treaters 18 can then both be used to treat both outside surfaces of previously untreated two-ply film, or one of the treaters can be used to treat the untreated outside surface of two-ply film which has previously been treated only on one outside surface. The remainder of these alternate processes are completed as previously explained with respect to FIGS. 2, 3, and 3A, there being a choice of using no water, water vapor, or adhesive with either standard or adhesive ink (FIGS. 2 and 10), using water or water vapor with either standard or adhesive ink (FIGS. 3 and 11), and using adhesives in addition to standard or adhesive ink (FIGS. 3A and 12).

In carrying out the processes illustrated in FIGS. 2, 3, 3A, and 10-12, normal unwind and rewind tensions used in standard printing press operations have been found sufficient, there having been found no preferable tensions required for the present printing invention or for the production of supply roll 1. Thus, it is advisable to use a tension control which will prevent the film from being stretched while at the same time obtaining good roll conformity.

Similarly, temperatures used in drying ovens may be in the conventional range in which film distortion does not occur, although it is preferred that the film be rewound unto product roll 9 without cooling the film in the normal manner, the lack of cooling typically being accomplished by shutting off the coolant to the chill roller. For example, in the use of polyethylene, a drying oven temperature of 100° F. has been found suitable, although higher temperatures may be used as long as distortion does not occur.

FIG. 4 shows storage or product roll 9 with printed legends 8 rolled up in the layers of film 6. Before bags or other packages are manufactured from product roll 9, the outer film of roll 9 must be oriented so that printed legends 8 are between films 6*a* and 6*b* with treated surfaces 2 and 3 in contact. This orientation process is described below.

When a completed roll 9 of double-wound product film has been printed and wound, the outer turn of the outer film layer 6*a* on roll 9 will either be a film surface on which the images are printed (in the case of printing on surface 3 of layer 6*a* as illustrated in the Figures) or will be a blank film that does not engage any of the printed material (as would be the case when printing is done on surface 2 of layer 6*b*). This outer film must be unwound from roll 9 either by making one full turn of film layer 6*a* about roll 9 (as is illustrated in FIG. 5) or by unwinding one full turn of the originally paired film layers from printed roll 9 and rewrapping the inner layer about the roll so that the inner layer becomes the outer layer on the rewound printed roll 9. The unwinding, or unwinding and rewrapping, effects a separation of film surfaces 4 and 5 which were originally paired in winding supply roll 1 so that printed legends 8 are between films 6*a* and 6*b* with treated surfaces 2 and 3 in contact. Ply 6*a* is then preferably cut off so that the ends of plies 6*a* and 6*b* are even. Thereafter, printed roll 9 may be unwound, again as a double-wound film, with printed images 8 confined between treated surfaces 2 and 3, so that printed images 8 are not exposed to abrasive or solvent action when the product film is later used, for example, in packages. FIG. 6 schematically shows how printed legends 8 are between surfaces 2 and 3 of layers *6a* and *6b*, the separation of the layers being shown only for illustrative purposes.

Even if the processes of FIGS. 2 or 10 have been used without adhesive inks, without the addition of water or water vapor as shown in FIGS. 3 and 11, and without the addition of laminating adhesive as shown in FIGS. 3A and 12, the linking attraction between the two layers will allow the film of product roll 9 to be processed in conventional bag-making or packaging equipment 29 or to otherwise be used in end-user packaging, as is schematically illustrated in FIG. 13. Accordingly, film prepared in accordance with any of the present trapped printing processes is useful in the manufacture of premade bags for handfilling as well as with form-fill-seal equipment when using automatic filling equipment. Although not necessary, if additional attraction is desired between the trapped printing layers, water or water vapor may be added, such as by the processes of FIGS. 3 and 11, and this will provide additional attraction without the use of special inks or adhesives; alternately, a film laminate may be desired, and this may be accomplished through the addition of an adhesive such as through the processes illustrated in FIGS. 3A and 12.

A bag or other package 30 fabricated from supply roll 9 is schematically shown in FIGS. 14 and 15.

The present invention is to be limited only in accordance with the scope of appending claims, since persons skilled in the art may devise other embodiments still within the limits of the claims.

I claim:

1. A process of preparing linked duplex film with trapped printing, the process comprising:

obtaining a storage roll of two-ply film with both outside surfaces of the film having been treated for printing or laminating prior to having been wound onto the storage roll;

feeding the two-ply film from the storage roll;

printing on one treated surface; and rewinding the two-ply film onto a product roll so that the two treated surfaces come into face-to-face contact.

2. The process of claim 1 wherein both plies of film comprise polyethylene.

3. The process of claim 1 wherein the feeding, printing, and rewinding steps are accomplished on standard printing equipment.

4. The process of claim 3 wherein both plies of film comprise polyethylene.

5. The process of claim 1 wherein the product roll is used in the manufacture of packages by unwinding the roll with the printing trapped between the two treated surfaces.

6. The process of claim 5 wherein both plies of film comprise polyethylene.

7. The process of claim 1 wherein water or water vapor is applied to one of the treated surfaces before the rewinding step.

8. The process of claim 7 wherein both plies of film comprise polyethylene.

9. The process of claim 7 wherein the feeding, printing, and rewinding steps are accomplished on standard printing equipment.

10. The process of claim 9 wherein both plies of film comprise polyethylene.

11. The process of claim 7 wherein the product roll is used in the manufacture of packages by unwinding the roll with the printing trapped between the two treated surfaces.

12. The process of claim 11 wherein both plies of film comprise polyethylene.

13. The process of claim 1 wherein an adhesive ink is used in the printing step.

14. The process of claim 13 wherein both plies of film comprise polyethylene.

15. The process of claim 13 wherein the feeding, printing, and rewinding steps are accomplished on standard printing equipment.

16. The process of claim 15 wherein both plies of film comprise polyethylene.

17. The process of claim 13 wherein the product roll is used in the manufacture of packages by unwinding the roll with the printing trapped between the two treated surfaces.

18. The process of claim 17 wherein both plies of film comprise polyethylene.

19. The process of claim 1 wherein an adhesive is applied to one of the treated surfaces prior to the rewinding step.

20. The process of claim 19 wherein both plies of film comprise polyethylene.

21. The process of claim 19 wherein the feeding, printing, and rewinding steps are accomplished on standard converting equipment.

22. The process of claim 21 wherein both plies of film comprise polyethylene.

23. The process of claim 19 wherein the product roll is used in the manufacture of packages by unwinding the roll with the printing trapped between the two treated surfaces.

24. The process of claim 23 wherein both plies of film comprise polyethylene.

25. A process of feeding linked two-ply film during a process of fabricating packages,)comprising:

obtaining a product roll of two-ply film with both outer film surfaces treated for printing or laminating and wound onto the roll with one of the treated surfaces having printing on that surface and with the two treated surfaces being in face-to-face contact, there being no adhesive or adhesive ink in the product roll; and unwinding the product roll during a process of fabricating packages so that a two-ply layer is unwound from the product roll with the printing trapped between the two treated surfaces, there being no adhesive or adhesive ink between the treated surfaces during the package fabrication process.

26. The process of claim 25 wherein both plies of film comprise polyethylene.

27. A process of feeding linked two-ply film during a process of fabricating packages, comprising:

obtaining a product roll of two-ply film with both outer film surfaces treated for printing or laminating and wound onto the roll with one of the treated surfaces having printing on that surface, with water or water vapor having been applied to one of the treated surfaces prior to winding the two-ply film onto the product roll, and with the two treated surfaces being in face-to-face contact, there being no adhesive or adhesive ink in the product roll; and unwinding the product roll during a process of fabricating packages so that a two-ply layer is unwound from the product roll with the printing trapped between the two treated surfaces, there being no adhesive or adhesive ink between the treated surfaces during the package fabrication process.

28. The process of claim 27 wherein both plies of film comprise polyethylene.

29. A process of fabricating a supply roll of two-ply film comprising the step of winding two layers of film onto a roll with both outside surfaces of the two-ply film treated for printing or laminating.

30. The process of claim 29 wherein both layers of film comprise polyethylene.

31. The process of claim 29 wherein the two-ply film is produced and treated during an extrusion process prior to the winding step.

32. The process of claim 31 wherein both layers of film comprise polyethylene.

33. The process of claim 29 wherein the film is produced in a casting process.

34. The process of claim 33 wherein both layers of film comprise polyethylene.

35. The process of claim 29 wherein:

the film is produced in a casting process; one surface of the film is treated for printing or laminating prior to the winding step;

the film is folded prior to the winding step so that it forms a two-ply layer with both outside surfaces treated for printing or laminating.

36. The process of claim 35 wherein both layers of film comprise polyethylene.

37. The process of claim 29 wherein:

the film is produced in a casting process;

the film is folded to form a two-ply layer prior to the winding step;

both outside surfaces of the two-ply film are treated for printing or laminating prior to the winding step.

38. The process of claim 37 wherein both layers of film comprise polyethylene.

39. The process of claim 29 wherein the two-ply film is created in an extrusion process comprising:

feeding an extrusion die with both opaque and transparent resin so that an extruded bubble is formed with approximately one-half of the bubble being transparent and one-half of the bubble being transparent;

flattening the bubble so that a two-ply film is formed with the transparent and opaque films substantially face-to-face and opposite one another; and treating the two outside surfaces of the two-ply film for printing or laminating prior to the winding step.

40. The process of claim 39 wherein both layers of film comprise polyethylene.

41. The process of claim 39 wherein the edges of the flattened tube are trimmed to provide two individual plies of film prior to the winding step.

42. The process of claim 41 wherein both layers of film comprise polyethylene.

43. A process of preparing a linked duplex film with trapped printing, the process comprising:

obtaining a storage roll of two-ply film with no more than one of the outer surfaces having been treated for printing or laminating prior to having been wound onto the roll;

unwinding the film from the storage roll;

treating the film as it is unwound so that both outside surfaces are treated for printing or laminating;

printing on one treated surface; and rewinding the two-ply film onto a product roll so that the two treated surfaces come into face-to-face contact.

44. The process of claim 43 wherein both plies of film comprise polyethylene.

45. The process of claim 43 wherein the feeding, printing, and rewinding steps are accomplished on standard printing equipment.

46. The process of claim 45 wherein both plies of film comprise polyethylene.

47. The process of claim 43 wherein the product roll is used in the manufacture of packages by unwinding the roll with the printing trapped between the two treated surfaces.

48. The process of claim 47 wherein both plies of film comprise polyethylene.

49. The process of claim 43 wherein water or water vapor is applied to one of the treated surfaces before the rewinding step.

50. The process of claim 49 wherein both plies of film comprise polyethylene.

51. The process of claim 49 wherein the feeding, printing, and rewinding steps are accomplished on standard printing equipment.

52. The process of claim 51 wherein both plies of film comprise polyethylene.

53. The process of claim 49 wherein the product roll is used in the manufacture of packages by unwinding the roll with the printing trapped between the two treated surfaces.

54. The process of claim 53 wherein both plies of film comprise polyethylene.

55. The process of claim 43 wherein an adhesive ink is used in the printing step.

56. The process of claim 55 wherein both plies of film comprise polyethylene.

57. The process of claim 55 wherein the feeding, printing, and rewinding steps are accomplished on standard printing equipment.

58. The process of claim 57 wherein both plies of film comprise polyethylene.

59. The process of claim 55 wherein the product roll is used in the manufacture of packages by unwinding the roll with the printing trapped between the two treated surfaces.

60. The process of claim 59 wherein both plies of film comprise polyethylene.

61. The process of claim 43 wherein an adhesive is applied to one of the treated surfaces prior to the rewinding step.

62. The process of claim 61 wherein both plies of film comprise polyethylene.

63. The process of claim 61 wherein the feeding, printing, and rewinding steps are accomplished on standard converting equipment.

64. The process of claim 63 wherein both plies of film comprise polyethylene.

65. The process of claim 61 wherein the product roll is used in the manufacture of packages by unwinding the roll with the printing trapped between the two treated surfaces.

66. The process of claim 65 wherein both plies of film comprise polyethylene.

* * * * *